US008418201B2

(12) United States Patent
Thijssen

(10) Patent No.: US 8,418,201 B2
(45) Date of Patent: Apr. 9, 2013

(54) SYSTEM AND METHOD FOR REPRODUCING AND DISPLAYING INFORMATION

(75) Inventor: Paulus Thomas Arnoldus Thijssen, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 12/518,297

(22) PCT Filed: Dec. 11, 2007

(86) PCT No.: PCT/IB2007/055013
§ 371 (c)(1),
(2), (4) Date: Jun. 9, 2009

(87) PCT Pub. No.: WO2008/072177
PCT Pub. Date: Jun. 19, 2008

(65) Prior Publication Data
US 2010/0026892 A1 Feb. 4, 2010

(30) Foreign Application Priority Data
Dec. 14, 2006 (EP) .................................... 06126185

(51) Int. Cl.
G06F 3/00 (2006.01)
G06F 13/00 (2006.01)
H04N 5/445 (2011.01)
(52) U.S. Cl. ................ 725/40; 725/37; 725/60; 725/61; 715/700; 715/716; 715/718; 715/719
(58) Field of Classification Search ...................... 725/37
See application file for complete search history.

(56) References Cited

U.S. PATENT DOCUMENTS

| 6,469,718 | B1 | | 10/2002 | Setogawa et al. | |
| 7,088,906 | B1 | * | 8/2006 | Shiraishi et al. | 386/200 |
| 2002/0040474 | A1 | * | 4/2002 | Ohkita | 725/37 |
| 2003/0169234 | A1 | | 9/2003 | Kempisty | |
| 2004/0128012 | A1 | * | 7/2004 | Lin | 700/100 |
| 2004/0130576 | A1 | * | 7/2004 | Fujita et al. | 345/781 |
| 2005/0108751 | A1 | * | 5/2005 | Dacosta | 725/39 |
| 2005/0177863 | A1 | * | 8/2005 | Jung et al. | 725/135 |
| 2005/0259979 | A1 | | 11/2005 | Huebner | |
| 2007/0015486 | A1 | * | 1/2007 | Marlowe | 455/345 |
| 2007/0076876 | A1 | * | 4/2007 | Kaplan | 380/255 |
| 2008/0111822 | A1 | * | 5/2008 | Horowitz et al. | 345/530 |

FOREIGN PATENT DOCUMENTS

| CN | 1717032 A | 1/2006 |
| EP | 1045225 A2 | 10/2000 |
| EP | 1619894 A1 | 1/2006 |
| JP | 2006134506 A | 5/2006 |
| WO | 0110111 A2 | 2/2001 |

* cited by examiner

Primary Examiner — Justin Shepard

(57) ABSTRACT

A vehicle entertainment system is described for reproducing and displaying information and control options. It comprises means for information reproduction (10) and user operating means for selecting one of the control options. There is a primary display (20,50) arranged in the front of the vehicle and at least a secondary display (40) for the rear seat passengers. Information adapting means (60,95) adapt the information to be displayed on the primary display (20,50) to a limited version including the control options. A full version of the information is displayed on the secondary display. In this way, the driver can control the system without being too much distracted by the information and the rear seat passengers see the complete version of the information.

18 Claims, 6 Drawing Sheets

SYSTEM AND METHOD FOR REPRODUCING AND DISPLAYING INFORMATION

BACKGROUND OF THE INVENTION

1. Technical field

The present invention relates to a system, apparatus, method and computer program for reproducing and displaying information, in particular video.

2. Description of Related Art

Systems for reproducing and displaying video in cars, such as rear-seat entertainment (RSE) systems are emerging. A rear-seat entertainment system typically consists of a DVD drive and one or more screens. FIG. 1 shows a typical configuration with roof mounting. It comprises a CD/DVD drive 10 mounted in the center stack in the front of the vehicle and a front display 20. The CD/DVD drive 10 is used for music playback and possibly for navigation. The front display 20 is used for display of center stack related matters (radio, board computer, navigation, etc.). The RSE system, which is installed for the rear seats, comprises a CD/DVD drive 30 and a display 40 for a first row of seats and optionally a further CD/DVD drive 30 and display 40 per additional row of seats. The CD/DVD drive 30 is used for movie (and music and photo) playback. The CD/DVD drives 30 and displays 40 are roof mounted. FIG. 2 shows a typical configuration with headrest mounting. The RSE system comprises a DVD drive 30 per row of seats and a display 40 per seat. The CD/DVD drive 30 is mounted in a console between the front chairs or on the roof. The displays are mounted in a headrest. Of course, all kind of mixed configurations are possible.

In the configurations shown in FIGS. 1 and 2 the center stack in the front and the RSE system are not connected. For cost saving reasons, now also configurations are emerging where the CD/DVD drive of the RSE system is shared with the drive of the center stack. This is shown in FIG. 3. Although the decoder back-end is integrated with the center stack, it is not possible to watch movies in the front, at least not while driving.

The configuration of FIG. 3 has some drawbacks. Typically, the RSE system is controlled via a remote control (RC) or via local keys. A RC may not be present, for example because the batteries are flat, the RC is broken or lost, or there is no RC at all, because car owners and manufacturers don't like loose objects in a car. For this reason, operation via local keys must always be possible. In a cost-optimal system, local keys are typically located near the decoder back-end to reduce wiring. In case of the configuration of FIG. 3, this means that the keys are located on the center stack and cannot be operated by the rear-seat passengers themselves.

Even if local keys are located near the rear-seat passengers or if there is a RC, there still may be situations where the rear-seat passengers cannot operate them. This is for example the case for children that are in a special seat and cannot reach the keys and for children that are too young to understand the keys. In itself, this should not be a big problem: the driver or front passenger simply inserts a disc and starts playback.

However, many DVD discs are authored such that you first enter a special menu comprising control options. Only after making the right selections in this menu and potentially several sub-menus, one can start playing the movie. In such a situation it is a problem if control is only possible from the front. A straightforward solution would be to allow display of the movie on the front display. This would allow the driver to operate the RSE system, easily. However, for safety reasons this is often prohibited at least while driving.

It is an object of the invention to provide a system and method that do not suffer from at least some of the above-mentioned drawbacks.

SUMMARY OF THE INVENTION

According to an aspect of the invention a system is provided for reproducing and displaying information and control options, such as a control menu comprising buttons. The system comprises means for information reproduction, user-operating means for selecting one of the control options, a primary display and at least a secondary display. The system furthermore comprises information adapting means for adapting the information to be displayed on the primary display to a limited version including the control options. In this way, the user is enabled to control the system based on the displayed control options. However by virtue of the display of only a limited version of the information, distraction of the user when controlling the system is avoided or at least substantially reduced.

EP 1 045 225 A2 discloses an information reproducing apparatus for use in a car. When the car is traveling, it is inhibited that the image information played back by a DVD reproducing apparatus is displayed on a display device, or the map information outputted from a navigation system is displayed. However, in this mode, the operation state of the DVD reproducing apparatus is displayed on the display device. So, in the information reproducing apparatus disclosed in EP 1 045 225 A2, when the car is traveling no control options of the DVD apparatus are displayed.

The system according to the present invention is preferably designed to display a complete version of the information on the secondary display. In this way, further users of the system have normal access to the information.

The system is preferably a (rear-seat) vehicle entertainment system, wherein the driver may control the system based on control options on the primary display in the front of the vehicle and the rear-seat passengers may watch the complete version of the (video) information on their secondary display(s). By virtue of the reduced distraction of the driver by the limited version of the information, safety is greatly enhanced.

Preferably, the means for information reproduction is an optical media playback apparatus, such as a DVD-player or CD-player. However, the present invention may also be used in other systems wherein control options are shown on a display, such as interactive TV.

According to an embodiment the system further comprises control means for detecting the presence of the control options and for generating a corresponding control signal. The information adapting means are designed for adapting the information to be displayed on the primary display to the limited version based on the control signal. In case that the information reproducing means is a DVD-system, the control options are embedded in the information. The DVD navigation engine is adapted for detecting when buttons (control options) are visible and when not. This is defined in the DVD standard.

Preferably, the information adapting means is designed for adapting the information to be displayed on the primary display to the limited version as long as the control options are present. Furthermore, the information adapting means may be designed for inhibiting the display of the information on the primary display when the control options are not present. Alternatively, the system is designed for displaying status information on the primary display when the control options are not present. So, the user (driver) can select a control option based on the limited version of the information on the primary display. As soon as the control options disappear, no information is displayed any more on the primary display or only the brief status information of the system is displayed. In this way, the safety is greatly enhanced. In this way, a user interface is obtained, which is very similar to the user interface of navigation systems. Therein the user can select an item from a list, such as a previously chosen destination or a point of interest. According to present safety standards, this is allowed while driving.

In case that the video reproducing means is a DVD player, an optimization might be to display only the subpictures (i.e. the graphical format of DVD) on the primary (front) display. This often gives a good indication of which control options are possible, but in many cases, the background video is needed as well to get a good understanding, for example in the case where buttons are part of the background video and only the border lines are authored as subpictures.

Therefore, according to a further preferred embodiment the limited version of the information comprises still video. A simple way to implement this embodiment would be to take only a snapshot of the background video and render the subpictures comprising the control options on top of that. This guarantees that all menus (control options) can be understood in the front (moving menu backgrounds do not add anything in that respect), with the least possible distraction for the driver. Note that the quality of the background video does not need to be optimal, so one can use a cheap front display if desired. So, also from a cost point of view this embodiment has advantages. The use of an expensive display in the front needed to display moving video is avoided.

According to a further embodiment the primary display is a character display and the system is designed for using Optical Character Recognition (OCR) to extract text belonging to the control options. The information adapting means is designed for including the text in the limited version of the information to be displayed on the character display. In this way the simple front displays, allowing only for the display of a few lines of text, present in many cars may be used for displaying the control options. In case that the system is a DVD system, the OCR techniques may be applied to the subpicture graphics and the background video to extract the text belonging to the control options (buttons).

According to a further alternative embodiment the primary display is a character display and the system is designed for using Optical Character Recognition to recognize icons belonging to the options and for translating the icons to text. The information adapting means is designed for including the text in the limited version of the information to be displayed on the character display. In this way, the cheaper character display may also be used as primary (front) display, when the control options comprise icons without text.

According to a further embodiment the limited version of the information has a predetermined duration in time. So, the information, which may be moving video, is displayed on the front display for a predetermined limited amount of time only (e.g. 10 seconds), so that the driver has some time to make the right selections.

According to a further aspect of the invention an apparatus is provided for use in a system for reproducing and displaying information and control options the apparatus comprising:
means for information reproduction, and
information adapting means for adapting the information to be displayed on a primary display, which may be coupled to the apparatus, to a limited version including the control options.

According to a still further aspect of the invention a method is provided for reproducing and displaying information and control options in a system comprising:
means for information reproduction,
user operating means for selecting one of the control options,
a primary display and at least a secondary display, the method comprising the step of adapting the information to be displayed on the primary display (20,50) to a limited version including the control options.

The invention may be implemented by means of a suitable computer program.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 1:
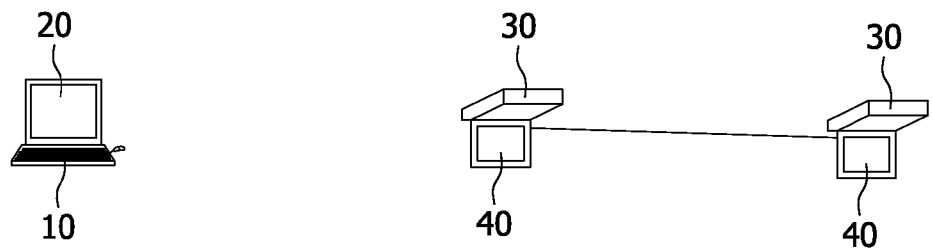
FIG. 1 shows a typical configuration of a prior art vehicle entertainment system with roof mounting.
Figure 2:
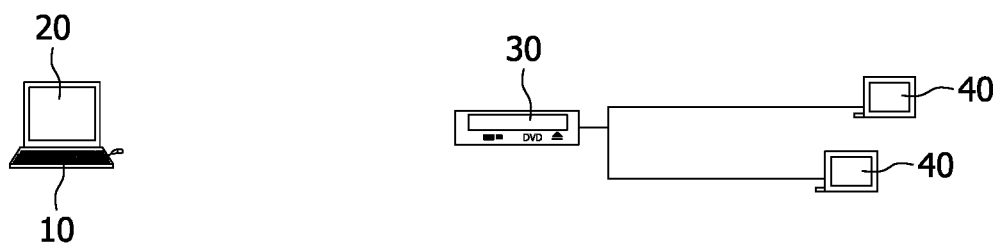
FIG. 2 shows a typical configuration of a prior art vehicle entertainment system with headrest mounting.
Figure 3:
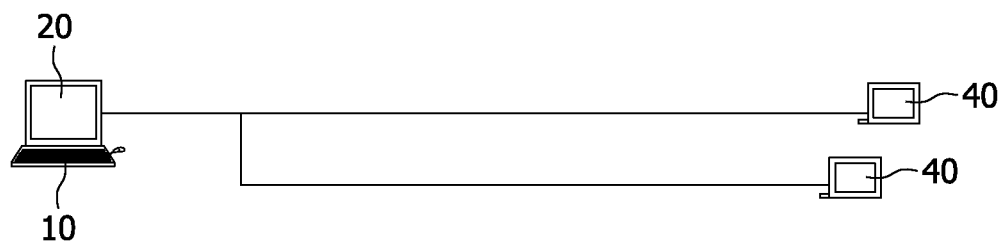
FIG. 3 shows the configuration of a prior art vehicle entertainment system with a single DVD-drive
Figure 4:
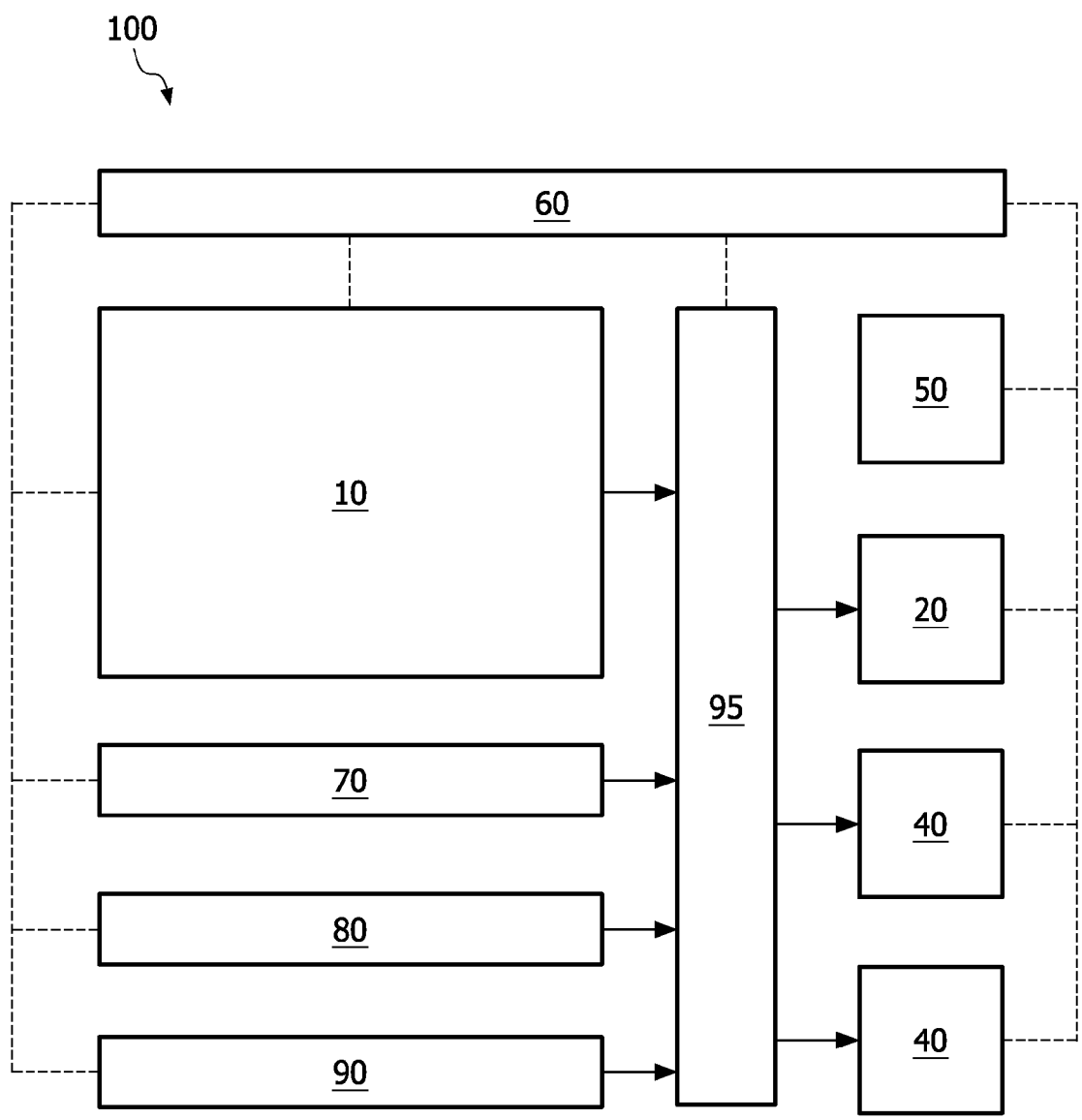
FIG. 4 shows a block diagram of an exemplary system according to the invention.

FIG. 4 shows a block diagram of an exemplary system 100 according to the invention. The system is for example a vehicle entertainment system. It comprises an information-reproducing device 10, which for example is a DVD playback module, and optionally, a radio 70, navigation system 80 and other Audio/Video producing devices 90. The system further comprises a control unit 60, an Audio/Video switch 95, one or more primary displays 20,50 arranged in the front of the car and one or more secondary displays 40 arranged in the back of the car. The control unit 60 and Audio/Video switch 95 together form information adapting means. One of the primary displays 50 is a simple character display suitable for displaying text but not for video. The figure only shows video display devices behind the Audio/Video switch, but of course also speakers can be connected. In the figure dashed lines indicate control interfaces and solid arrows indicate audio/video (A/V) interfaces.

Advantageously, a single apparatus comprises some of the components of the system, for example the components indicated in the figure as 10,60,70,80,90 and 95.

Figure 5:
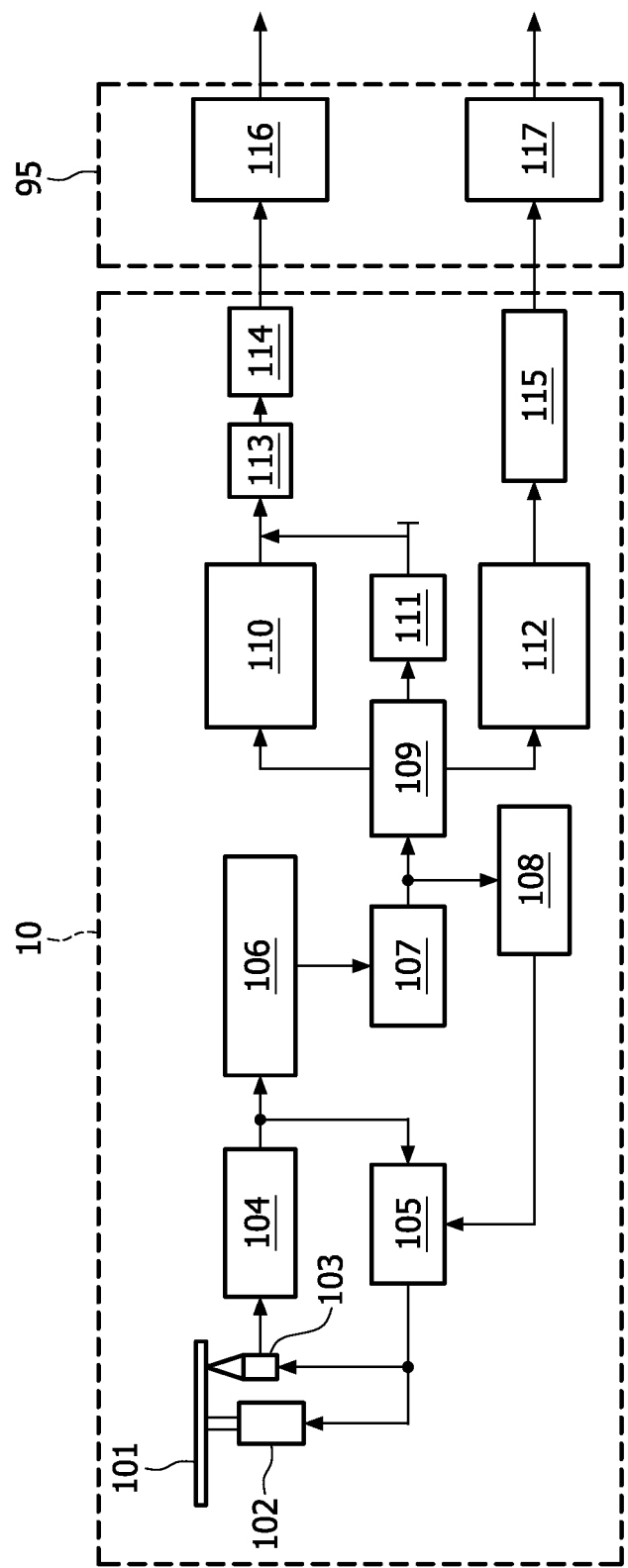
FIG. 5 shows a more detailed block diagram of one of the components of the system.

The DVD playback module 10 and Audio/Video switch 95 are shown in more detail in FIG. 5. The DVD playback module 10 comprises a spindle motor 102 to rotate a DVDdisk 101 and optical reading means 103 for optically reading the information from the DVD 101. It further comprises a playback circuit 104 for processing the read-out data and a demodulation circuit 106 for demodulating them. Data separation takes place through a buffer memory 107 and a demultiplexer 109. In this way the video data are separated and supplied to a video expansion circuit 110, the subpictures are separated and supplied to a graphics expansion circuit 111, and the audio data are separated and supplied to an audio expansion circuit 112. The output of the video expansion circuit 110 and the graphics expansion circuit 111 are connected to a video mixer circuit 113. The digital video/graphics signal produced by the video mixer circuit 113 is supplied to a video D/A converter 114 and the digital audio signal produced by the audio expansion circuit 112 is supplied to an audio D/A converter 115 in order to be converted into analog signals. The analog video/graphics signal is supplied to an image forming circuit 116 in the Audio/Video switch 95 and the analog audio signal is supplied to an audio output circuit 117 in the Audio/Video switch 95. The image forming circuit 116 is connected to the primary display 20 and the secondary displays 40 and the audio output circuit 117 is connected to one or more speakers (not shown). Further the DVD playback module 10 is provided with a servo-circuit 105 to servo-control the spindle motor 102 and a control section 108 to control the overall operations of the DVD playback module 10. The control section 108 is connected to the control unit 60 (connection not shown). The components of the DVD-playback module 10 and Audio/Video switch 95 here described are well known to the skilled person. For a more complete description of these components, reference is made to the earlier cited application EP 1 045 225 A2, incorporated by reference herein.

The system as shown in FIGS. 4 and 5 works as follows: the DVD playback module is programmed with a suitable computer program to detect when there are buttons (control options) in the DVD-information. It sends a notification to the control unit 60 via the control interface. The control unit 60 instructs the Audio/Video switch 95 to display a limited version of the information on the front display 20. The limited version may be limited in time, limited in content or both. The display of the information may last for a predetermined (fixed) time but preferably, it lasts until there are no buttons any more. The information displayed on the front display may be moving video but preferably it consists only of subpictures, which comprise the control options, or it consists of a snapshot of the video (still video) having subpictures superposed thereon. The user may select one of the control options by means of suitable user operating means (not shown), such as a keyboard.

In case that the information displayed on the front display is moving video, the DVD playback module 10 and the Audio/Video switch 95 shown in FIG. 5 may be used. In case that the information displayed on the front display consists only of subpictures, some adaptations in the DVD playback module 10 and Audio/Video switch 95 are needed: the graphics expansion circuit 111 should have an additional output, which via an additional video D/A converter 114 should be connected to an additional image forming image circuit 116 in the Audio/Video switch 95, which is connected only to the front display 20. In case that the information displayed on the front display consists of a snapshot with subpictures superposed thereon, an additional circuit could be included that uses at the output of the (first) image forming circuit 116 to construct a snapshot, mixes the snapshot with the subpictures and supplies the obtained data to the additional image forming circuit. However, there are other possibly ways to implement these embodiments, which can be readily implemented by a person of normal skill in the art.

The Audio/Video switch 95 depicted in FIG. 5 does not affect the display of information on the secondary displays 40. So, on these displays a full version of the information (i.e. including the complete content and not limited in time) is displayed. In order to display a limited version on the front display 20 and a full version on the rear displays 40, suitable switching means are needed in the Audio/Video switch 95, which can be readily implemented by a person of normal skill in the art.

In case of the use of an OCR (Optical Character Recognition) algorithm to recognize the control options present in the information, the DVD playback module 10 performs OCR. Thereto it is programmed with a suitable computer program. Alternatively, OCR can be implemented using well-known hardware components. Strings are communicated to the control unit 60 via the control interface. The control unit 60 determines how to display them via the character display 50.

The Audio/Video switch may include video scaling capabilities to cater for different and/or low cost displays. In the example here described, Audio/Video switching is performed in the analog domain. However, there may be implementations where Audio/Video switching is done in the digital domain, for example inside the DVD playback module, or if a DVD playback module is used with digital Audio/Video output. Special interfaces between the DVD playback module 10 and the Audio/Video switch 95 are required in this case.

In the embodiment shown in FIGS. 4 and 5 two separate control units 60,108 are present. This is preferred in case of a modular approach. However, the two control units 60,108 can also be integrated into a single unit.

Figure 6:
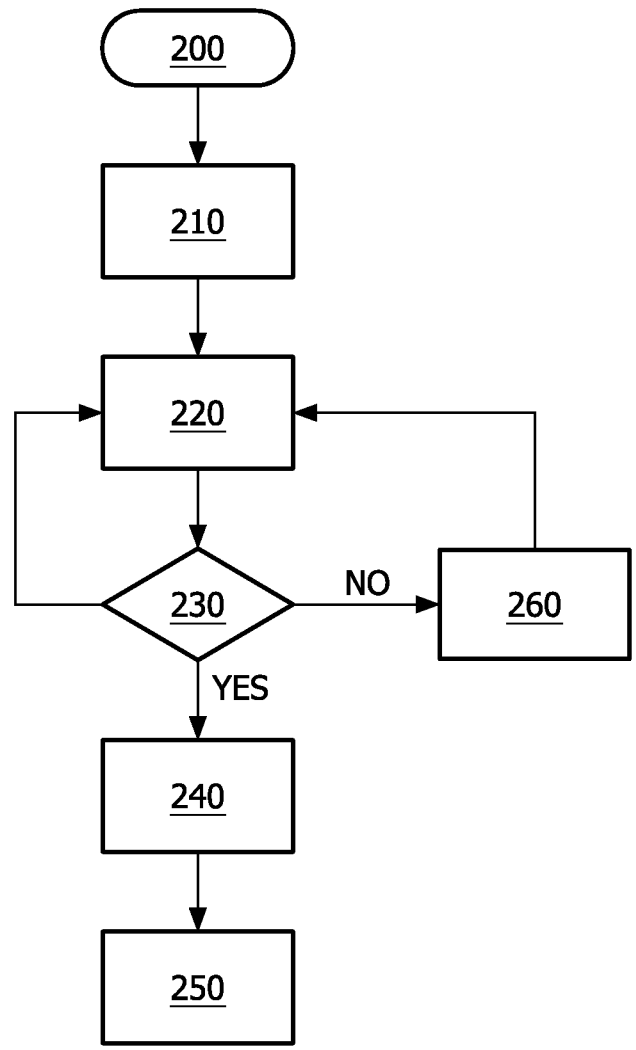
FIG. 6 shows an exemplary flow chart for implementing the present invention.

FIG. 6 shows a simple flowchart illustrating the working of the DVD playback module 10 used in the system according to the present invention. After step 200 (start) in step 210 the disc is loaded. Then in step 220 playback is started. In step 230 it is detected if there are any control options (buttons). As soon as the DVD playback module 10 detects buttons, it (optionally) performs OCR (step 240) and notifies (step 250) the control unit 60 that there are buttons (plus optionally the results of the OCR). When buttons are no longer visible, the DVD playback module detects this (step 230) and notifies the control unit (step 260).

Figure 7:
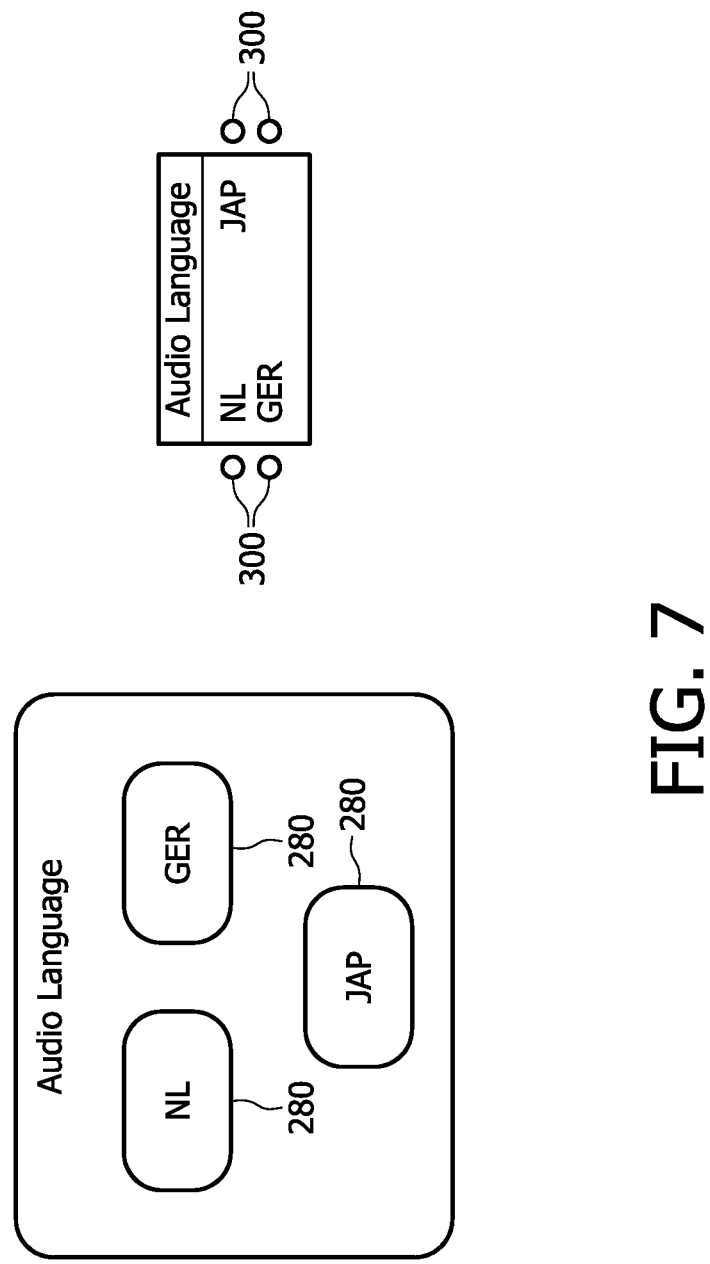
FIG. 7 shows a first example of screen shots according to the invention.
Figure 8:
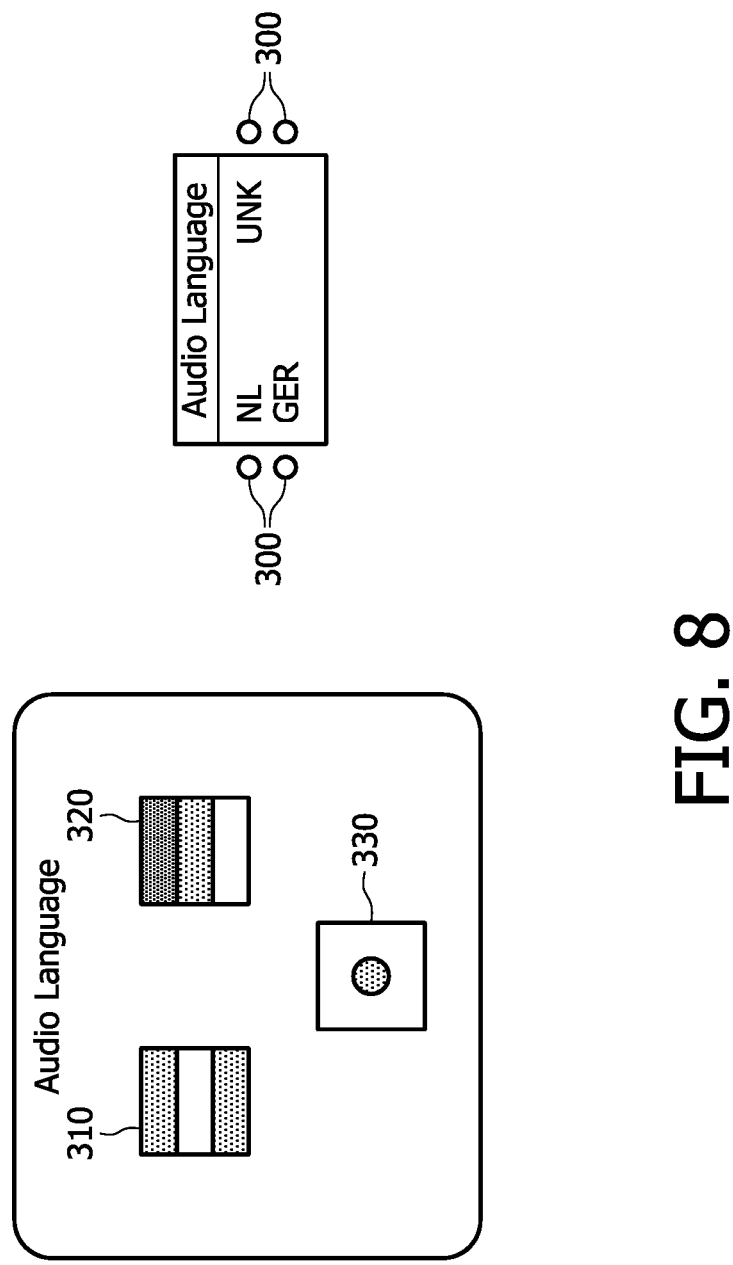
FIG. 8 shows a second example of screen shots according to the invention.

FIGS. 7 and 8 show some sample screen shots for the different displays in the system.

FIG. 7 illustrates how a DVD menu could be displayed on a simple (character) display.

The left hand side of the figure shows the DVD menu as it is authored on the disc and as it is displayed in case of no further processing by the Audio/Video switch 95. This example shows an audio language selection menu with three buttons 280. The text elements may be encoded in the video or in the graphics (subpictures) or any combination thereof. Therefore, the OCR algorithm shall operate on the mixed video/graphics. Because the button locations are known, the OCR algorithm can differentiate between the menu title and the button names.

The right hand side of FIG. 7 shows an example of how the results can be displayed on the character display 50. The small circles 300 on the side denote buttons that may be located next to the display. Of course, any button location and layout may be thought of, including the option of a touch screen.

FIG. 8 illustrates a smart extension to the OCR algorithm. The left hand side of the figure shows the DVD menu as it is authored on the disc and as it is displayed in case of no further processing by the Audio/Video switch 95. The right hand side of FIG. 8 shows an example of how the results can be displayed on the character display 50. Sometimes menus do not have text, but only icons. If no text can be found for a certain button, the button can be indicated via a default string (e.g. 'UNK'). However, often national flags are used for (audio, subtitle, menu) language selection. According to a smarter OCR algorithm recognizing some national flags can be recognized and translated into a corresponding string. In the example of FIG. 8, the system knows the Dutch 310 and the German flag 320, but it does not know the Japanese flag 330.

As will be recognized by those skilled in the art, the innovative concepts described in the present application can be modified and varied over a wide range of applications. The invention may also be applied with another optical media playback module than a DVD-player, such as a CD-player. Furthermore, the invention may be applied in all kinds of systems wherein control options are displayed together with content information. An example of such a system is interactive TV. Furthermore, it is possible that the above-described functionality, wherein a limited information version is displayed on the front display 20, is only implemented in case that a vehicle is traveling. In case that the vehicle is not moving or if the engine is switched off a full version of the information may be shown on the front display.

Accordingly, the scope of patented subject matter should not be limited to any of the specific exemplary teachings discussed, but is instead defined by the following claims. Any reference signs in the claims shall not be construed as limiting the scope thereof.

The invention claimed is:

1. A system for reproducing and displaying information and control options comprising:
   means for information reproduction;
   user operating means for selecting one of the control options,
   a primary display and at least one secondary display;
   control means for determining control options and generating a control option signal indicating the control options;
   information adapting means for:
      limiting content of the information; and
      generating control options depending on the control option signal; and
      combining the limited content of the information with the control options to form a limited version of the information, wherein the limited version is displayed on the primary display and a complete version of the information on the at least one secondary display, said limited version of the information being further limited in duration of display.

2. The system according to claim 1 wherein the system is a vehicle entertainment system.

3. The system according to claim 1 wherein the means for information reproduction is an optical media playback apparatus.

4. The system according to claim 1 further comprising control means for detecting the presence of the control options and for generating a corresponding control signal, the information adapting means being designed for limiting the limited version of the information to be displayed on the primary display based on the control signal.

5. The system according to claim 4 wherein the control options are embedded in the information.

6. The system according to claim 4 wherein the information adapting means is designed for limiting the limited version of the information to be displayed on the primary display as long as the control options are present.

7. The system according to claim 6 wherein the information adapting means is designed for inhibiting the display of the limited version of the information on the primary display when the control options are not present.

8. The system according to claim 6 wherein the system is designed for displaying status information on the primary display when the control options are not present.

9. The system according to claim 1 wherein the limited version of the information comprises still video of the information.

10. The system according to claim 1 wherein the limited version of the information comprises DVD subpictures of the information.

11. The system according to claim 1 wherein the primary display is a character display and wherein the system is designed for using Optical Character Recognition to extract text belonging to the control options and wherein the information adapting means is designed for including the extracted text in the limited version of the information to be displayed on the character display.

12. The system according to claim 1 wherein the primary display is a character display and wherein the system is for using Optical Character Recognition to recognize icons belonging to the options and for translating the icons to text and wherein the information adapting means is designed for including the text in the limited version of the information to be displayed on the character display.

13. The system according to claim 1 wherein the limited version of the information has a predetermined duration in time.

14. An apparatus for use in a system for reproducing and displaying information and control options, the apparatus comprising:
   means for information reproduction, and
   information adapting means coupled to said means for information reproduction, said information adapting means adapting the information to be displayed on a primary display to a limited version of the information, and a complete version of the information on at least one secondary display, said limited version representing the control options and a limited content of said information, said limited version of the information further being limited in duration of display.

15. The apparatus according to claim 14 further comprising control means for detecting the presence of the control options and for generating a corresponding control signal, the information adapting means being designed to display the limited version of the information on the primary display based on the control signal.

16. A method for reproducing and displaying information and control options in a system comprising:
   means for information reproduction,
   user operating means for selecting one of the control options,
   a primary display and at least one secondary display, and
   control means for:
      determining control options; and
      generating a control option signal indicating the control options;
   the method comprising the steps of:
      adapting the information to represent a limited content of said information and generating the control options depending on the control option signal, and combining the limited content of said information with the control options to form a limited version of the information, and displaying the limited version on the primary display and a complete version of the information on the at least one secondary display, said limited version of the information being further limited in duration of display.

17. The method according to claim 16 comprising the further steps of detecting the presence of the control options and adapting the information to be displayed on the primary display to the limited version based on the detection.

18. A non-transitory media encoded with a computer program comprising computer program code means, when said program is run on a computer, said computer performs the steps of:

adapting information to represent a limited amount of content of said information and generating control options depending on a control option signal, and combining the adapted information with the control options to form a limited version of the information, and displaying the limited version of the information on a primary display and a complete version of the information on at least one secondary display, said limited version of the information further being limited in duration of display.

* * * * *